Aug. 18, 1953   J. M. HARRISON ET AL   2,649,406
SEPARATION OF ACETONE AND PROPIONALDEHYDE BY
AZEOTROPIC DISTILLATION WITH CHLOROFORM
Filed March 14, 1952
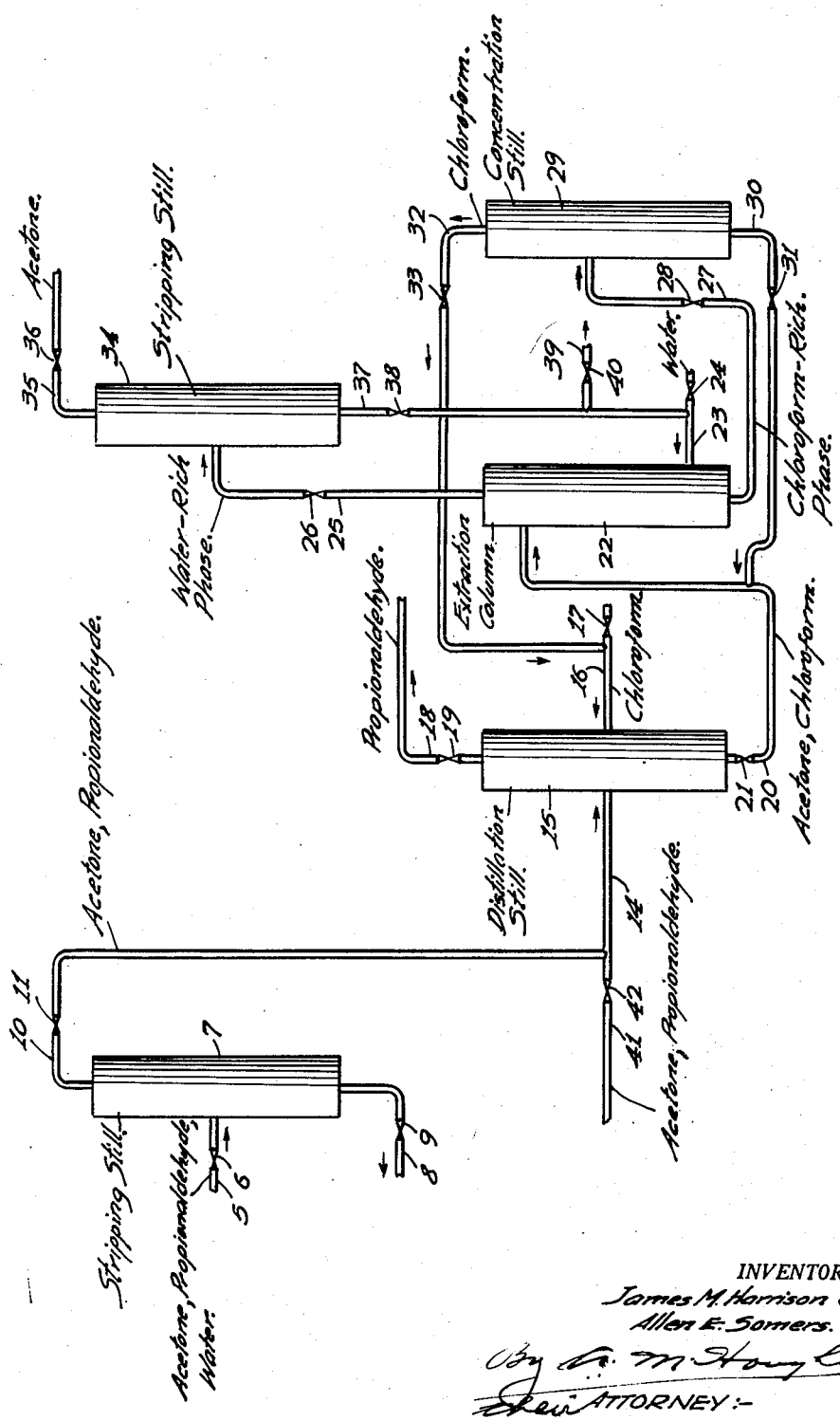
INVENTORS.
James M. Harrison And
Allen E. Somers.
ATTORNEY:-

Patented Aug. 18, 1953

2,649,406

UNITED STATES PATENT OFFICE 2,649,406

SEPARATION OF ACETONE AND PROPIONALDEHYDE BY AZEOTROPIC DISTILLATION WITH CHLOROFORM

James M. Harrison, Oakmont, and Allen E. Somers, Pittsburgh, Pa., assignors to Gulf Research & Development Company, Pittsburgh, Pa., a corporation of Delaware Application March 14, 1952, Serial No. 276,614

4 Claims. (Cl. 202—42)

This invention relates to a process of separating organic compounds and more particularly to a process of separating a mixture of acetone and propionaldehyde.

Mixtures of acetone and propionaldehyde are obtained in the oxygenated products from the Fischer-Tropsch synthesis and from the oxidation of low-molecular weight hydrocarbons, such as natural gas. These may occur as aqueous or nonaqueous mixtures. It is desirable to separate the aqueous or nonaqueous mixture and obtain acetone and propionaldehyde as products. It is difficult to obtain a sharp separation by distillation between acetone and propionaldehyde because they boil within a narrow range.

We have found that a mixture of acetone, propionaldehyde and water can be separated by first stripping acetone and propionaldehyde from the mixture and then passing the mixture of acetone and propionaldehyde to a distillation zone, adding chloroform to the distillation zone, removing propionaldehyde as overhead and discharging it as product, and removing as bottoms a mixture containing the azeotropic amounts of about 20 weight per cent acetone and 80 weight per cent chloroform.

The mixture of acetone and chloroform is then further separated. This is preferably accomplished by passing the mixture of azeotropic composition to an extraction zone, adding water, preferably from five to ten volumes of water per volume of the mixture of chloroform and acetone, to the extraction zone, removing a raffinate phase containing acetone and chloroform from the bottom of the extraction zone, passing the raffinate phase to a second distillation zone, removing chloroform as overhead and a mixture containing the azeotropic amounts of about 20 per cent acetone and 80 per cent chloroform as bottoms from the second distillation zone while the extract phase containing water and acetone is passed from the top of the extraction zone to a second stripping zone where acetone is removed overhead and water is removed as bottoms. Preferably the chloroform removed overhead from the second distillation zone is recycled to the first distillation zone and the mixture containing azeotropic amounts of about 20 per cent acetone and 80 per cent chloroform is recycled to the extraction zone.

The process of our invention is advantageous because it furnishes an efficient method for separating a mixture of acetone and propionaldehyde. As was pointed out previously these compounds boil within a narrow range, propionaldehyde boiling at 48.8° C. at 760 mm. of Hg and acetone boiling at 56.2° C. at the same pressure. When chloroform is added to this mixture in the azeotropic amount with acetone, the next most volatile constituent in the system after propionaldehyde is the maximum boiling azeotrope of chloroform and acetone containing about 20 per cent acetone and about 80 per cent choloroform. This mixture boils at 64.4° C. at 760 mm. of Hg. Thus, the addition of chloroform increases the difference in boiling points between the components to be separated from 7.4° C. to 15.6° C.

The separation of a mixture of acetone and chloroform of azeotropic composition in an extraction zone with water is also efficiently accomplished. We have found that in a one-stage extraction at room temperature with about five to ten volumes of water per volume of mixture of chloroform and acetone, an extract is obtained free of chloroform and a raffinate is obtained free of water.

The process of our invention can be understood more fully by reference to the accompanying drawing, the single figure of which shows a diagrammatical layout of apparatus which will be described in conjunction with an embodiment of our invention.

Referring to the drawing, a mixture of acetone, propionaldehyde and water is passed by line 5 containing valve 6 into stripping still 7. Water is removed as bottoms from stripping still 7 by line 8 containing valve 9 and is discharged from the system. A mixture of acetone and propionaldehyde is removed overhead from stripping still 7 by line 10 containing valve 11 and is passed by line 10 to line 14.

The mixture of acetone and propionaldehyde in line 14 is introduced into distillation still 15. Chloroform is passed into distillation still 15 by line 16 containing valve 17. This still, in the present embodiment, is operated at about atmospheric pressure and so that the temperature of the overhead vapors is about 50° to about 55° C. The rate of addition of chloroform is adjusted so that sufficient chloroform is present at all times to form a mixture containing the azeotropic amounts of about 20 weight per cent acetone and about 80 per cent chloroform. Propionaldehyde is removed overhead from still 15 by line 18 containing valve 19 and is discharged as product. A mixture containing the azeotropic amounts of about 20 weight per cent acetone and about 80 weight per cent chloroform is removed as bottoms from still 15 by line 20 containing valve 21 and is passed into extraction column 22. It is generally desirable to carry out the process with a small excess of chloroform which is removed from the still with the mixture of acetone and chloroform containing the azeotropic amounts of about 20 weight per cent acetone and about 80 per cent chloroform. Water is admitted to extraction column 22 by line 23 containing valve 24. An extract mixture containing water and acetone is removed overhead from extraction column 22 by line 25 containing valve 26, and a mixture of acetone and chloroform is removed as raffinate from the bottom of extraction column 22 by line 27 containing valve 28.

The mixture of acetone and chloroform is passed by line 27 into concentration still 29. A mixture of acetone and chloroform containing the azeotropic amount of about 20 weight per cent acetone and about 80 weight per cent chloroform is removed as bottoms from concentration still 29 by line 30 containing valve 31 and is recycled by line 20 to extraction column 22. Chloroform in excess of the azeotropic amount is removed overhead from concentration still 29 by line 32 containing valve 33 and is recycled by line 16 into distillation still 15.

The extract phase containing water and acetone removed from the top of extraction column 22 by line 25 is passed into stripping still 34. Acetone is removed overhead from stripping still 34 by line 35 containing valve 36 and is discharged as product. Water is removed from the bottom of stripping still 34 and is recycled by line 37 containing valve 38 to line 23 and then to extraction column 22. A portion of the water may be discharged by line 39 containing valve 40 when it is desired to reduce the amount of water introduced into extraction column 22.

Some mixtures of acetone and propionaldehyde obtained in commercial operations do not contain water in admixture with the other materials. Where it is desired to treat only such a nonaqueous mixture, the stripping still 7 need not be used and the acetone-propionaldehyde mixture is introduced into the system through line 41 having valve 42. Moreover, both aqueous and nonaqueous mixtures can be separated using equipment as shown in the drawing; the aqueous mixture being passed through the stripping still 7 and the nonaqueous mixture being introduced through line 41.

An example of the operation of the process of our invention will now be described. A mixture containing 50 parts acetone, 20 parts propionaldehyde, and 220 parts water is charged into stripping still 7. 220 parts of water are discharged as bottoms through line 8. A mixture of 50 parts acetone and 20 parts propionaldehyde is removed overhead by line 10 and is combined in line 14 with a mixture containing 110 parts acetone and 70 parts propionaldehyde introduced by line 41. The resulting mixture of 160 parts acetone and 90 parts propionaldehyde is charged into azeotropic distillation still 15. 640 parts of chloroform recycled as described below are introduced into distillation still 15 by line 16. 90 parts propionaldehyde are removed overhead by line 18 and are discharged as product. A mixture containing 640 parts of chloroform and 160 parts of acetone is removed from distillation still 15 by line 20 and is combined with a mixture containing 360 parts chloroform and 90 parts acetone, recycled as described below, by line 30. The resulting mixture containing 1000 parts chloroform and 250 parts acetone is introduced into extraction column 22. 7100 parts of water recycled as described hereinafter are introduced into extraction column 22 by line 23. An extract phase containing 7100 parts of water and 160 parts of acetone is removed overhead from extraction column 22 by line 25. A raffinate phase containing 1000 parts of chloroform and 90 parts acetone is removed from extraction column 22 and is passed by line 27 into concentration still 29. 640 parts of chloroform are removed overhead from concentration still 29 and are recycled by lines 32 and 16 to azeotropic distillation still 15. A mixture containing the azeotropic amounts of 360 parts chloroform and 90 parts acetone is removed as bottoms from concentration still 29 and is passed by lines 30 and 20 to extraction column 22.

The extract phase containing 7100 parts of water and 160 parts of acetone is passed into stripping column 34. 160 parts of acetone are removed overhead as product by line 35 and 7100 parts of water are removed as bottoms and recycled to extraction column 22 by lines 37 and 23.

An embodiment of our invention can be carried out as a batch process. As an example of such an embodiment, a mixture containing 56.5 weight per cent chloroform, 29 per cent propionaldehyde and 14.5 per cent acetone is charged to a glass column, four feet long and one inch in diameter, packed with stainless steel carding teeth and having about 35 theoretical plates. The operating reflux ratio is adjusted to about 10:1. Propionaldehyde is removed first at a temperature of 48.8° C. at 760 mm. of Hg and the chloroform-acetone constant boiling mixture is then removed at about 64.4° C. The chloroform-acetone constant boiling mixture is then extracted with water in the manner previously described.

Obviously many modifications and variations of the invention as hereinbefore set forth may be made without departing from the spirit and scope thereof and therefore only such limitations should be imposed as are indicated in the appended claims.

We claim:

1. A process which comprises adding chloroform to a mixture of acetone and propionaldehyde, distilling the resulting mixture of acetone, propionaldehyde and chloroform, removing propionaldehyde overhead as product, and removing as bottoms a mixture containing azeotropic amounts of acetone and chloroform.

2. A process which comprises adding chloroform to a mixture of acetone and propionaldehyde in an amount at least equivalent to that required to form a mixture containing the azeotropic amounts of about 20 weight per cent acetone and about 80 weight per cent chloroform, distilling the resulting mixture of acetone, propionaldehyde, and chloroform, removing propionaldehyde overhead as product, removing as bottoms a mixture containing the azeotropic amounts of about 20 weight per cent acetone and about 80 weight per cent chloroform, and separating acetone as product from said mixture of chloroform and acetone.

3. A process of separating a mixture of acetone and propionaldehyde which comprises adding chloroform to said mixture of acetone and propionaldehyde in an amount at least equivalent to that required to form a mixture containing the azeotropic amounts of about 20 weight per cent acetone and about 80 weight per cent chloroform, distilling the resulting mixture of acetone, propionaldehyde, and chloroform in a first distillation zone, removing propionaldehyde as overhead and a mixture containing the azeotropic amounts of about 20 weight per cent acetone and about 80 weight per cent chloroform as bottoms from said first distillation zone, extracting said mixture of acetone and chloroform of azeotropic composition with water in an extraction zone to form an extract mixture of acetone and water and a raffinate mixture of acetone and chloroform, separating acetone as product from the extract mixture, distilling the raffinate mixture of chloroform and acetone in a second distillation zone to remove chloroform overhead and said mixture of acetone and chloroform of azeotropic composition as bottoms, and recycling said mixture of acetone and chloroform of azeotropic composition to said extraction zone.

4. A process of separating a mixture of acetone, propionaldehyde and water which comprises removing water from said mixture of acetone, propionaldehyde and water by distillation in a first distillation zone, adding chloroform to the overhead mixture of acetone and propionaldehyde from the first distillation zone in an amount at least equivalent to that required to form a mixture containing the azeotropic amounts of about 20 weight per cent acetone and about 80 weight per cent chloroform, distilling the resulting mixture of acetone, propionaldehyde and chloroform in a second distillation zone, removing propionaldehyde as overhead at a temperature below 64.6° C. at 760 mm. of Hg and a mixture containing the azeotropic amounts of about 20 weight per cent acetone and 80 weight per cent chloroform from said second distillation zone, extracting said mixture of acetone and chloroform with about 5 to about 10 volumes of water in an extraction zone to form an extract mixture of water and acetone and a raffinate mixture of acetone and chloroform, passing the extract mixture of acetone and water to a third distillation zone, separating acetone overhead as product and recycling water as bottoms from the third distillation zone to the extraction zone, distilling the raffinate mixture of acetone and chloroform in a fourth distillation zone to remove chloroform overhead at a temperature below 64.4° C. at 760 mm. of Hg and a mixture of acetone and chloroform of azeotropic composition as bottoms from the fourth distillation zone, and recycling said mixture of acetone and chloroform of azeotropic composition to the extraction zone.

JAMES M. HARRISON.
ALLEN E. SOMERS.

References Cited in the file of this patent

UNITED STATES PATENTS

| Number | Name | Date |
|---|---|---|
| 2,412,649 | Riethof | Dec. 17, 1946 |
| 2,433,306 | Teter et al. | Dec. 23, 1947 |
| 2,452,460 | Hansley | Oct. 26, 1948 |
| 2,597,009 | Lobo et al. | May 20, 1952 |

OTHER REFERENCES

Jour. Am. Chem. Soc., Sept. 1941, pages 2475–2478.

Horsley, Tables of Azeotropic Data, Analytical Chemistry, vol. 19, August 1947, page 515.